United States Patent
Maruyama

(10) Patent No.: US 12,087,900 B2
(45) Date of Patent: Sep. 10, 2024

(54) METHOD OF MANUFACTURING ELECTRODE PLATE FOR BATTERY, METHOD OF MANUFACTURING BATTERY, AND BATTERY

(71) Applicant: SANYO Electric Co., Ltd., Kadoma (JP)

(72) Inventor: Masahide Maruyama, Nara (JP)

(73) Assignee: SANYO Electric Co., Ltd., Osaka (JP)

( * ) Notice: Subject to any disclaimer, the term of this patent is extended or adjusted under 35 U.S.C. 154(b) by 4 days.

(21) Appl. No.: 17/963,490

(22) Filed: Oct. 11, 2022

(65) Prior Publication Data

US 2023/0033345 A1 Feb. 2, 2023

Related U.S. Application Data

(62) Division of application No. 16/479,780, filed as application No. PCT/JP2018/001512 on Jan. 19, 2018, now Pat. No. 11,646,438.

(30) Foreign Application Priority Data

Jan. 24, 2017 (JP) ................. 2017-010332

(51) Int. Cl.
*H01M 10/04* (2006.01)
*H01M 50/531* (2021.01)

(52) U.S. Cl.
CPC ....... *H01M 10/045* (2013.01); *H01M 50/531* (2021.01)

(58) Field of Classification Search
CPC ............ H01M 10/045; H01M 50/531
See application file for complete search history.

(56) References Cited

U.S. PATENT DOCUMENTS

| | | | |
|---|---|---|---|
| 4,738,173 | A | 4/1988 | Kiuchi |
| 5,652,074 | A | 7/1997 | Larson, III et al. |
| 5,958,625 | A | 9/1999 | Rao |
| 2002/0007552 | A1 | 1/2002 | Singleton et al. |
| 2005/0031961 | A1 | 2/2005 | Tsunekawa et al. |

(Continued)

FOREIGN PATENT DOCUMENTS

| JP | H9-183099 A | 7/1997 |
|---|---|---|
| JP | 2008-66050 A | 3/2008 |

(Continued)

OTHER PUBLICATIONS

International Search Report dated Apr. 3, 2018, issued in counterpart Application No. PCT/JP2018/001512. (2 pages).

*Primary Examiner* — Brian R Ohara
*Assistant Examiner* — Emily Elizabeth Freeman
(74) *Attorney, Agent, or Firm* — WHDA, LLP

(57) ABSTRACT

A method of manufacturing an electrode plate for a battery of the present disclosure includes: a step (A) of forming a through hole (20) in a strip-shaped electrode plate (10); and a step (B) of cutting the strip-shaped electrode plate along a width direction. In the step (A), the through hole is formed at a position on a cutting line (21) which extends in the width direction of the strip-shaped electrode plate, in the step (B), cutting of the strip-shaped electrode plate is performed by multiple cutting blades (30A, 30B) disposed along the cutting line, and at least one cutting blade of the multiple cutting blades is disposed at the position of the through hole.

6 Claims, 4 Drawing Sheets

(56) References Cited

U.S. PATENT DOCUMENTS

| | | | |
|---|---|---|---|
| 2012/0115020 A1* | 5/2012 | Hwang | H01M 10/049 |
| | | | 429/163 |
| 2013/0247637 A1 | 9/2013 | Min et al. | |
| 2014/0255755 A1 | 9/2014 | Kwon et al. | |
| 2015/0030911 A1* | 1/2015 | Miyazaki | H01M 4/523 |
| | | | 429/163 |
| 2016/0141587 A1* | 5/2016 | Suh | H01M 50/126 |
| | | | 429/186 |
| 2018/0131009 A1* | 5/2018 | Suehiro | H01M 50/186 |
| 2018/0226687 A1 | 8/2018 | Asai et al. | |

FOREIGN PATENT DOCUMENTS

| | | |
|---|---|---|
| JP | 2014-179217 A | 9/2014 |
| JP | 2014-232591 A | 12/2014 |
| JP | 2017-63004 A | 3/2017 |
| JP | 2017-103092 A | 6/2017 |
| WO | 0035036 A1 | 6/2000 |

\* cited by examiner

METHOD OF MANUFACTURING ELECTRODE PLATE FOR BATTERY, METHOD OF MANUFACTURING BATTERY, AND BATTERY

CROSS REFERENCE TO RELATED APPLICATIONS

This application is a Division of U.S. patent application Ser. No. 16/479,780, filed Jul. 22, 2019, which is a National Stage Entry of International Application No. PCT/JP2018/001512 filed Jan. 19, 2018, which claims the benefit of Japanese Patent Application No. 2017-010332 filed in the Japan Patent Office on Jan. 24, 2017, each of which is incorporated by reference herein in its entirety.

TECHNICAL FIELD

The present disclosure relates to a method of manufacturing an electrode plate for a battery, a method of manufacturing a battery including an electrode body having a positive electrode plate and a negative electrode plate, and a battery including an electrode body in which a positive electrode plate and a negative electrode plate are disposed to be opposed to each other via a separator.

BACKGROUND ART

An electrode body used for a battery such as a secondary battery belongs to a winding type in which strip-shaped positive electrode plate and negative electrode plate are winded via a separator or a stacked type in which sheet-shaped positive electrode plate and negative electrode plate are stacked via a separator. In order to increase the capacity density of the battery, a stacked-type electrode body is suitable.

In order to improve the productivity, a positive electrode plate and a negative electrode plate used for a stacked-type electrode body are normally manufactured by cutting a positive electrode plate and a negative electrode plate formed in a strip shape into a predetermined size (for instance, PTL 1).

CITATION LIST

Patent Literature

PTL 1: Japanese Published Unexamined Patent Application No. 2014-179217

SUMMARY OF INVENTION

Technical Problem

The size of an electrode plate itself is aimed to be increased according to a high capacity of the battery. However, when the length in a width direction is enlarged in a strip-shaped electrode plate, and the electrode plate having a large length in a width direction is cut using one cutting blade, it is difficult to maintain the accuracy of the linearity of the cutting blade as the length of the cutting blade is increased. Thus, it is difficult to ensure a necessary clearance between a punch and a die along a width direction.

In contrast, when a strip-shaped electrode plate is cut in a width direction using multiple cutting blades, it is extremely difficult to maintain the quality of the shape of a cutting plane, for example, a burr or a projection is formed particularly in a connection portion of a cutting area formed by each of the cutting blades.

The present disclosure has been made in consideration of the above-mentioned problem, and it is the main object of the present disclosure to provide a method of manufacturing an electrode plate for a battery with a high quality of the shape of a cut portion even when the length of the electrode plate in a width direction is large in the method of manufacturing the electrode plate for a battery by cutting a strip-shaped electrode plate into a predetermined size.

Solution to Problem

A method of manufacturing an electrode plate for a battery according to the present disclosure provides the method by cutting a strip-shaped electrode plate into a predetermined size, the method including:

a step (A) of forming a through hole in the strip-shaped electrode plate; and a step (B) of cutting the strip-shaped electrode plate along a width direction.

In the step (A), the through hole is formed at a position on a cutting line which extends in the width direction of the strip-shaped electrode plate, the step (B) is performed by multiple cutting blades disposed along the cutting line, and one end of at least one blade of the cutting blades in the width direction is disposed at a position on the through hole.

Advantageous Effects of Invention

According to the present disclosure, it is possible to provide a method of manufacturing an electrode plate for a battery with a high quality of the shape of a cutting plane even when the length of the electrode plate in a width direction is large in the method of manufacturing the electrode plate for a battery by cutting a strip-shaped electrode plate into a predetermined size.

DESCRIPTION OF EMBODIMENTS

Hereinafter, an embodiment of the present disclosure will be described in detail based on the drawings. It is to be noted that the present disclosure is not limited to the following embodiment. Also, changes may be made as needed in a range not departing from the range which achieves the effect of the present disclosure.

Figure 1:
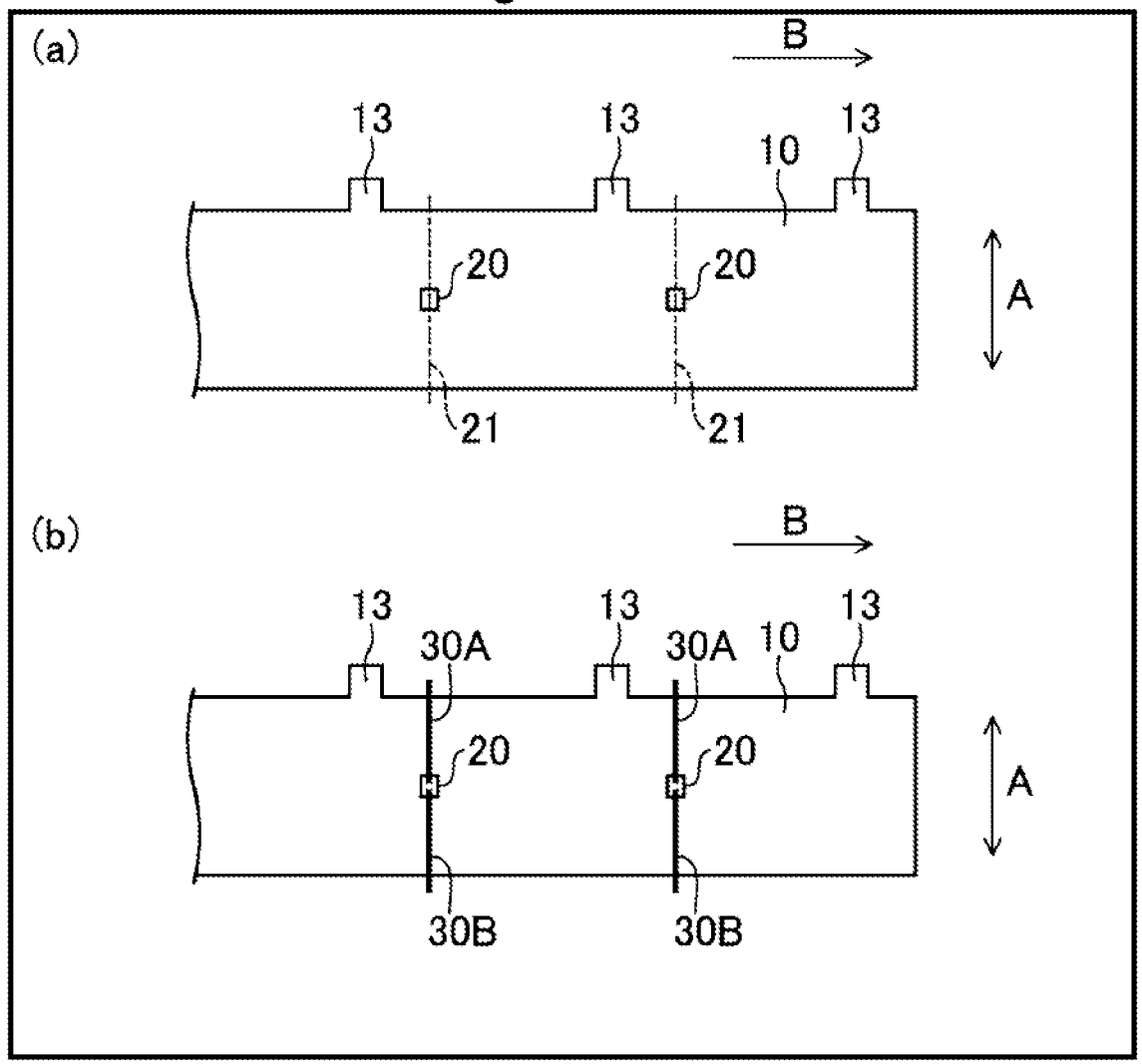
FIGS. 1(a) and (b) are plan views schematically illustrating a method of manufacturing an electrode plate for a battery in an embodiment of the present disclosure.

(*a*), (*b*) of FIG. 1 are plan views schematically illustrating a method of manufacturing an electrode plate for a battery in an embodiment of the present disclosure. The electrode plate for a battery in the embodiment is manufactured by cutting a strip-shaped electrode plate into a predetermined size. Also, the electrode plate for a battery manufactured in the embodiment is applied to a stacked-type electrode body in which a positive electrode plate and a negative electrode plate are stacked via a separator. It is to be noted that in the following description, an electrode plate for a battery may be referred to as a "single plate" to distinguish from a strip-shaped electrode plate.

First, as illustrated in (a) of FIG. 1, a strip- shaped electrode plate 10 is prepared. Here, the electrode plate 10 is one of a positive electrode plate and a negative electrode plate. Also, it is possible to use a strip-shaped electrode plate 10 in which an active material layer 10B is formed on both sides of a strip-shaped core 10A, as described in FIG. 2. Also, at one end of the strip-shaped electrode plate 10 in a width direction A, multiple tabs 13 are formed at predetermined intervals along a longitudinal direction B.

As illustrated in (a) of FIG. 1, multiple through holes 20 are formed in the strip-shaped electrode plate 10 prepared. Here, the through holes 20 are each formed at a position on a cutting line 21 which extends in the width direction A of the strip-shaped electrode plate 10.

Next, as illustrated in (b) of FIG. 1, the strip-shaped electrode plate 10 is cut along the width direction A. Here, the cutting is performed by two cutting blades 30A, 30B which are disposed along the cutting line 21.

Figure 2:
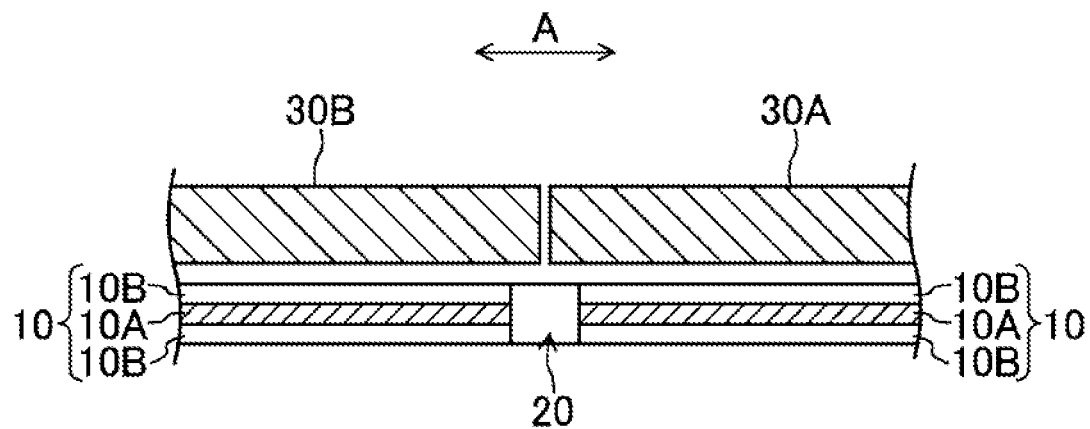
FIG. 2 is an enlarged sectional view illustrating the positional relationship between two cutting blades and through holes each along a cutting line.

FIG. 2 is an enlarged sectional view illustrating the positional relationship between the two cutting blades 30A, 30B and the through holes 20 each along a cutting line 21. As illustrated in FIG. 2, a gap (portion where ends of the cutting blades 30A, 30B are opposed to each other along the cutting line 21) between the two cutting blades 30A, 30B is disposed at the position of a through hole 20. It is to be noted that the cutting is performed by a combination of molds of a punch and a die, and FIG. 2 illustrates only the mold (upper blade) for a punch, and the mold (lower blade) for a die is omitted.

In the embodiment, the two cutting blades 30A, 30B maintain the linearity of each blade in the width direction A, and have a length enough to ensure a necessary clearance between the punch and the die. Thus, even when the length of the strip-shaped electrode plate 10 in the width direction A is longer than a length (a length which can ensure a necessary clearance between the punch and the die) for which cutting can be applied, the strip-shaped electrode plate 10 can be cut along the width direction A by connecting the two cutting blades. Consequently, even when the length of the strip-shaped electrode plate 10 in the width direction A is large, an electrode plate for a battery can be manufactured while the quality of a cutting shape is maintained.

In addition, since the gap between the two cutting blades 30A, 30B is disposed at the position of a through hole 20, the two cutting blades 30A, 30B do not have to be aligned on a cutting line 21 linearly.

Figure 3:
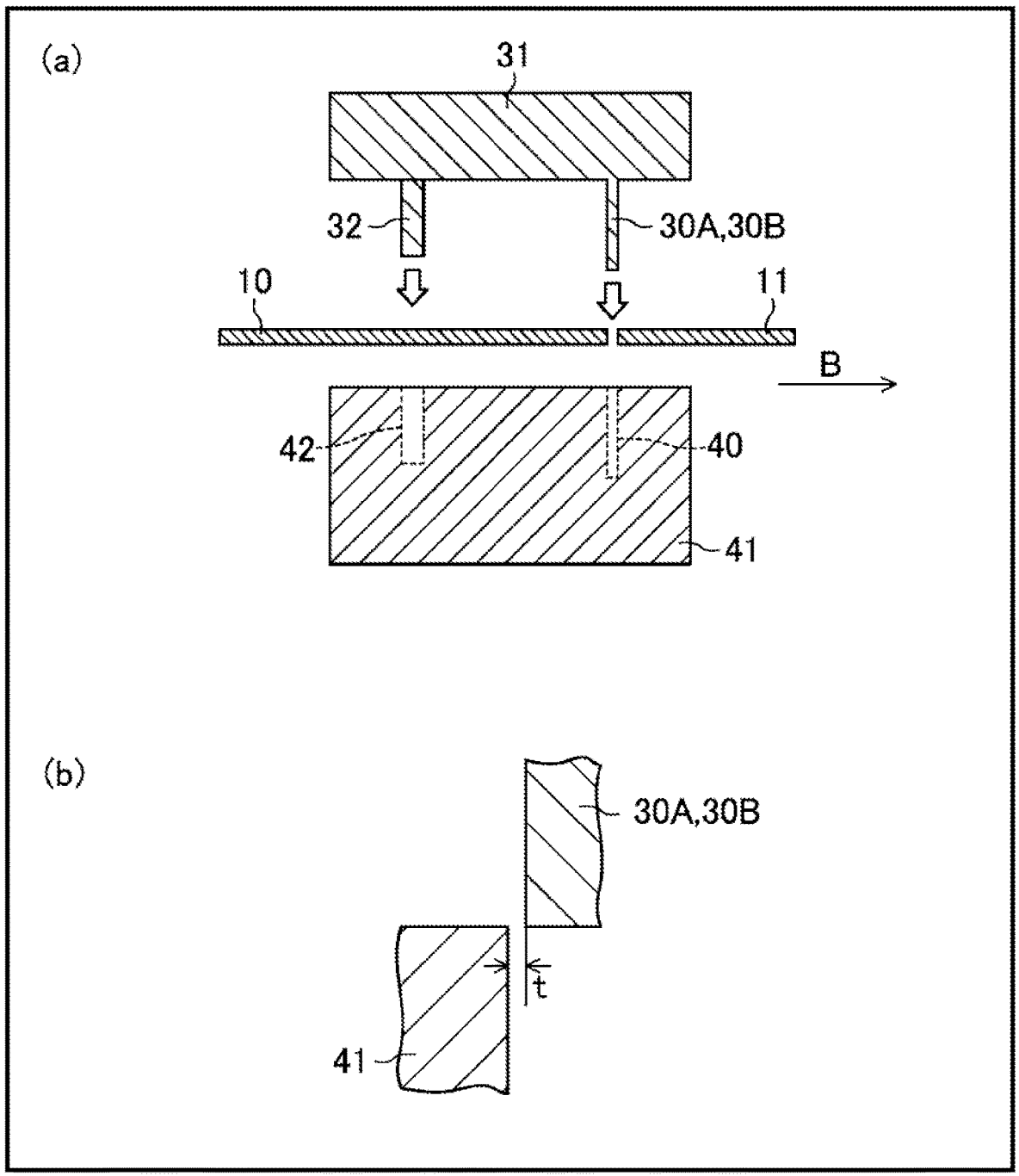
FIG. 3(a) is a sectional view illustrating a method of continuously executing a step of forming through holes in an electrode plate and a step of cutting the electrode plate while transporting the electrode plate, and (b) is a sectional view illustrating a clearance between the blade surface of a cutting blade of a punch (plate) and the blade surface of a cutting blade of a die (plate).

(*a*) of FIG. 3 is a sectional view illustrating a method of continuously executing a step of forming through holes 20 in the strip-shaped electrode plate 10 and a step of cutting the strip-shaped electrode plate 10 with the through holes 20 formed along the width direction A while transporting the strip-shaped electrode plate 10 in the longitudinal direction B.

As illustrated in (*a*) of FIG. 3, a punch plate 31 and a die plate 41 are disposed with the strip-shaped electrode plate 10 interposed therebetween. The punch plate 31 includes two cutting blades 30A, 30B for cutting the electrode plate 10, and a hole punch 32 for forming a through hole 20 in the electrode plate 10. In contrast, the die plate 41 includes a cutting blade 40 opposed to the two cutting blades 30A, 30B, and a cutting blade 42 opposed to the hole punch 32.

The strip-shaped electrode plate 10 is transported in the longitudinal direction B of the electrode plate 10 using a transport unit (not illustrated). Here, the punch plate 31 is disposed so that the cutting blades 30A, 30B are positioned downstream in a transport direction B of the electrode plate 10 with respect to the hole punch 32.

Thus disposed punch plate 31 is lowered to the die plate 41, and thereby formation of a through hole 20 and cutting of the electrode plate 10 are performed on the strip-shaped electrode plate 10 simultaneously. Consequently, the through hole 20 is formed on the upstream side, and the electrode plate 10 is cut by the two cutting blades 30A, 30B on the downstream side, and thereby an electrode plate (single plate) 11 for a battery cut into a predetermined size can be manufactured continuously.

It is to be noted that as illustrated in (b) of FIG. 3, clearance t between the blade surface of the cutting blades 30A and 30B of the punch (plate) 31, and the blade surface of the cutting blade of the die (plate) 41 is preferably less than or equal to 3 μm. When the clearance t exceeds 3 μm, droop occurs at an end face of the cut electrode plate, and a stress is applied to the end face of the electrode plate, thus it is not preferable.

It is to be noted that in the embodiment, a method of manufacturing an electrode plate for a battery has been described based on a cutting technique in which cutting by the cutting blades 30A, 30B is performed at the simultaneous timing, and the electrode plate is cut in a state where an end, near the cutting blade 30B, of the cutting blade 30A in the width direction A is on a through hole 20, and an end, near the cutting blade 30A, of the cutting blade 30B in the width direction A is on a through hole 20. However, the method of manufacturing an electrode plate for a battery of the present disclosure is not limited to this technique. For instance, a portion between a through hole 20 and the end side at one end of the electrode plate 10 in the width direction may be cut by the cutting blade (first cutting blade) 30A as a first cutting step, and an area between a through hole 20 and the other end of the electrode plate 10 in the width direction may be cut by the cutting blade (second cutting blade) 30B as a second cutting step different from the first cutting step. Also, the lengths of the cutting blades may not be the same. When cutting timings are different, and the lengths of the cutting blades are not the same, the electrode plate may be cut in a state where one end of the cutting blade for cutting later in the width direction is not on a through hole, and further extends to the cutting blade for cutting early.

Figure 4:
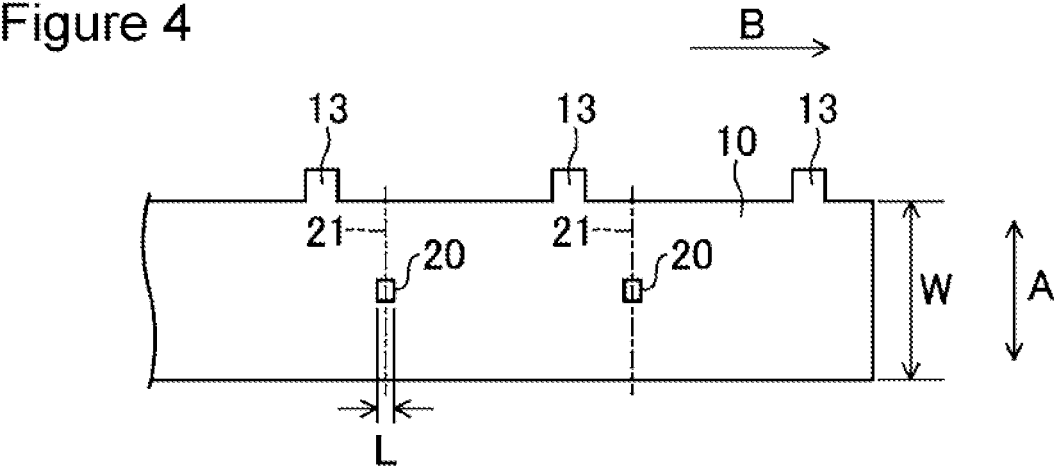
FIG. 4 is a plan view schematically illustrating the configuration of an electrode plate and through holes in an embodiment of the present disclosure.

In the embodiment, as illustrated in FIG. 4, when cutting is performed by the cutting blades 30A, 30B simultaneously, as long as a length L of a through hole 20 in the longitudinal direction B is larger than the distance between the opposed ends of the cutting blades 30A, 30B in the width direction, the length L is not particularly limited. In order to reduce decrease in the battery capacity due to formation of the through holes 20, the length L of the through hole 20 in the longitudinal direction B is preferably small as much as possible, and specifically is preferably less than or equal to 4 mm.

Although the shape of each through hole 20 has been described as a rectangular through hole in the embodiment, the method of manufacturing an electrode plate for a battery of the present disclosure is not limited to this. For instance, each through hole 20 may be a circular through hole.

Also, as illustrated in FIG. 4, when a length W of the strip-shaped electrode plate 10 in the width direction A is greater than or equal to 100 mm, the method of manufacturing an electrode plate for a battery in the embodiment can be applied particularly favorably. As described above, when the electrode plate 10 having a large length W in the width direction A is cut using one cutting blade, it is difficult to ensure the accuracy of the linearity of the cutting blade in the width direction A. However, in the embodiment, even when the length W of the electrode plate 10 in the width direction A is greater than a length (typically, less than 100 mm) which can be cut using one cutting blade, the strip-shaped electrode plate 10 can be cut along the width direction A by connecting the two cutting blades 30A, 30B.

Figure 5:
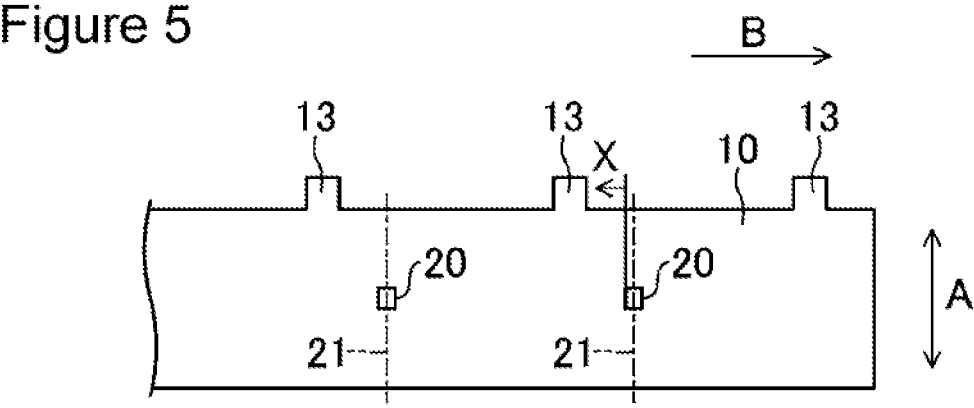
FIG. 5 is a plan view schematically illustrating the configuration of tabs in an embodiment of the present disclosure.
Figure 7:
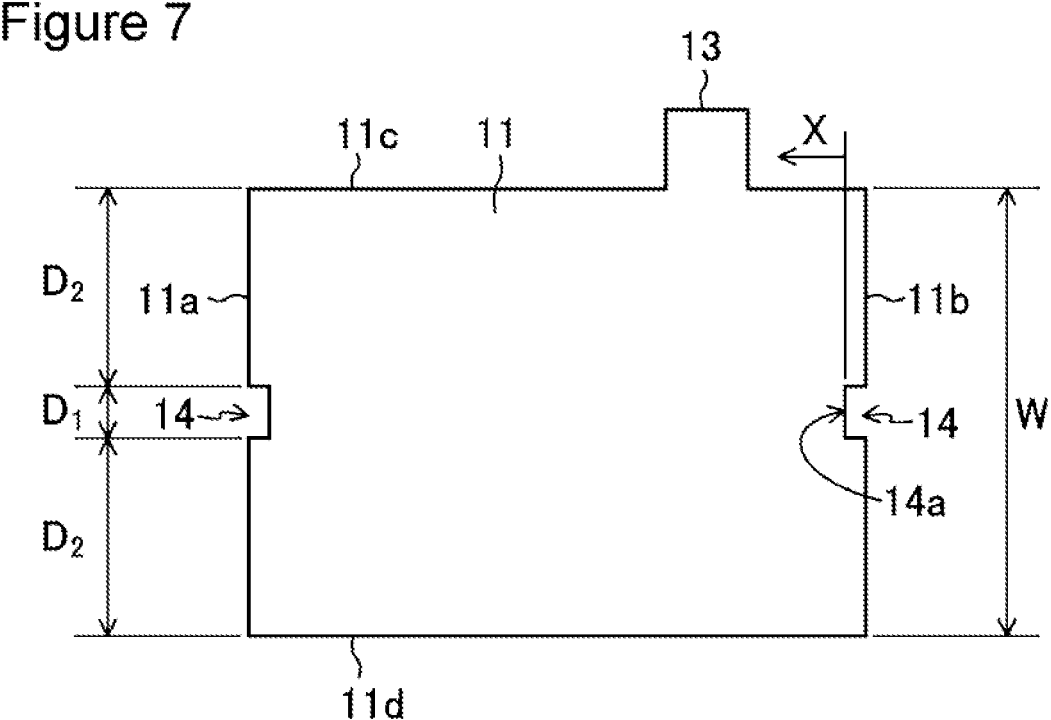
FIG. 7 is a plan view schematically illustrating the configuration of an electrode plate (single plate) for a battery manufactured by the method of manufacturing an electrode plate for a battery in an embodiment of the present disclosure.

Meanwhile, in the electrode plate (single plate) 11 for a battery manufactured by cutting the strip-shaped electrode plate 10, as illustrated in FIG. 7, a pair of notches 14 are formed in end sides 11a, 11b opposed to each other. If the depth of each notch 14 extends inwardly of the single plate 11 with respect to a tab 13 formed in the single plate 11, paths, which bypass from the single plate 11 to the tab 13 and via which power is collected, are increased. Thus, in order to reduce such bypass paths, as illustrated in FIG. 5, multiple tabs 13 formed in the electrode plate 10 are each preferably formed at a position away from the cutting line 21 in the longitudinal direction B, that is, at a position away from the end face of the through hole 20 in the X direction relative to the through hole 20 formed at the position on the cutting line 21.

Figure 6:
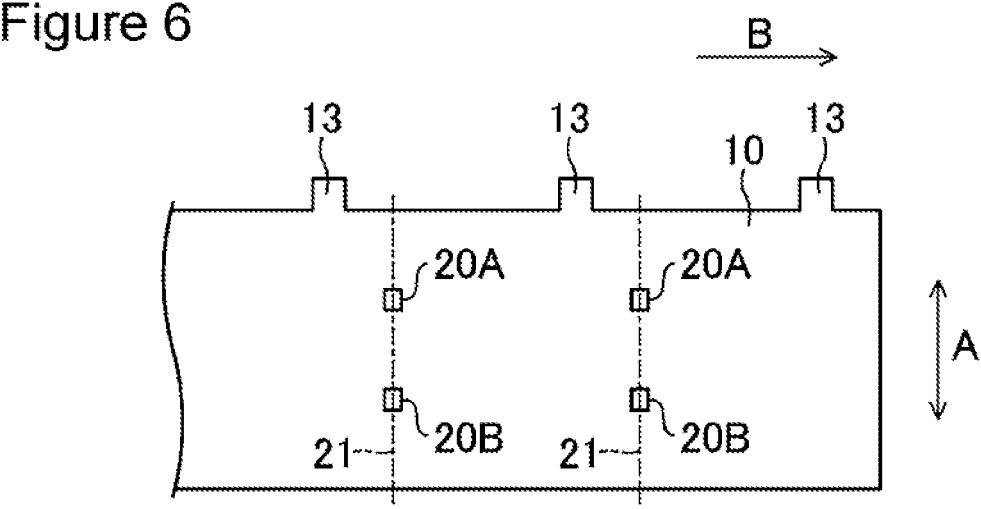
FIG. 6 is a plan view schematically illustrating the configuration of through holes in an embodiment of the present disclosure.

In the embodiment, the number of through holes 20 formed on the cutting lines 21 extending in the width direction A of the strip-shaped electrode plate 10 is not particularly limited, and may be determined as needed according to the length W of the electrode plate 10 in the width direction A. For instance, FIG. 6 illustrates the case where two through holes 20A, 20B are formed on each cutting line 21, and in this case, the electrode plate 10 is cut using three cutting blades. It is to be noted that the interval between the through holes 20A, 20B may be determined so that the lengths of the three cutting blades used are substantially the same.

In the embodiment, the strip-shaped electrode plate 10 is applicable to a positive electrode plate or a negative electrode plate, or a laminated body in which a positive electrode plate or a negative electrode plate, and a separator are stacked.

Also, in a method of manufacturing a battery including an electrode body having a positive electrode plate and a negative electrode plate, the positive electrode plate or the negative electrode plate are preferably manufactured by the method of manufacturing an electrode plate for a battery in the embodiment.

FIG. 7 is a plan view schematically illustrating the configuration of an electrode plate (single plate) 11 for a battery manufactured by the method of manufacturing an electrode plate for a battery in the embodiment. It is to be noted that the single plate 11 in the embodiment is at least one electrode plate of the positive electrode plate and the negative electrode plate, and is applied to a battery including an electrode body in which the positive electrode plate and the negative electrode plate are disposed to be opposed to each other via a separator.

As illustrated in FIG. 7, in the single plate 11 in the embodiment, a pair of notches 14 are formed in end sides 11a, 11b opposed to each other. Also, in another end side 11c different from the end sides 11a, 11b with the notches 14 formed, a tab 13 extending from the end side 11c is formed.

In the single plate 11 in such a configuration, when a stacked-type electrode body is formed by stacking the positive electrode plate and the negative electrode plate, each notch 14 can be used as a positioning mark.

Also, as illustrated in FIG. 7, the tab 13 is preferably formed at a position away from the end side 14a with a notch 14 formed in a perpendicular direction X to the end side 14a relative to the notch 14. Thus, it is possible to reduce the paths which bypass from the single plate 11 to the tab 13 and via which power is collected. As a consequence, the internal resistance of the battery can be reduced. Also, it is possible to reduce the occurrence of inductance caused by the paths which bypass the notch 14 and via which power is collected to the tab 13.

In the embodiment, a description has been given using a configuration in which the tab formed in the single plate is formed on a long side between the end sides of the single plate. However, the method of manufacturing an electrode plate for a battery of the present disclosure is not limited to this configuration. For instance, a configuration may be adopted in which a tab is formed on a short side between the end sides of the single plate, and a cutting plane by the cutting blade is formed on a long side.

Also, the depth of each notch 14 is preferably small as much as possible. Thus, it is possible to reduce a decrease in the battery capacity caused by formation of the notches 14. In addition, it is possible to reduce an increase in the resistance of the single plate 11 due to a constriction portion of the single plate 11 formed by a pair of notches 14.

As a preferred mode of the single plate 11 in the embodiment, as illustrated in FIG. 7, the length W of the end sides 11a, 11b each with a notch 14 formed is preferably greater than or equal to 100 mm. In addition, the pair of notches 14 are preferably opposed to each other. In addition, a notch 14 is preferably formed at the center of the end sides 11a, 11b with the notch 14 formed. Also, a length D1 of a notch 14 in the direction along the end sides 11a, 11b with the notch 14 formed is preferably shorter than the length (D2×2) of the end sides 11a, 11b with the notch 14 formed, excluding the notch 14.

As a preferred mode of the single plate 11 in the embodiment, it is preferable that the single plate 11 have a conductive core and an active material layer formed on the surface of the core, and the notch 14 be formed at an overlapping position in the core and the active material layer. In addition, it is preferable that the single plate 11 further have a separator on the active material layer, and the notch 14 be formed at an overlapping position in the core, the active material layer, and the separator.

At this point, before the through holes 20 are formed in the strip-shaped electrode plate 10, the separator is bonded onto the active material layer in advance, and the core, the active material layer, and the separator are cut all together, and an active material thereby can be prevented from being slipped from the active material layer in through holes and a cutting area, which is preferable.

Figure 8:
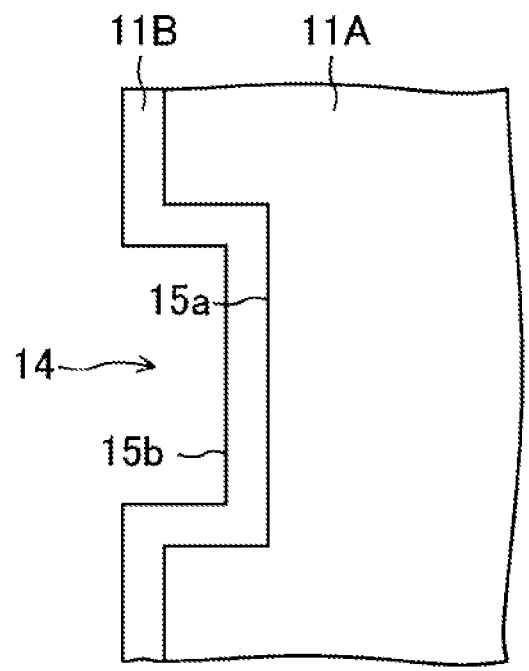
FIG. 8 is a plan view schematically illustrating the configuration of a laminated body of a positive electrode plate and a negative electrode plate.

As a preferred mode of the single plate 11 in the embodiment, as illustrated in FIG. 8, in a laminated body of a positive electrode plate 11A and a negative electrode plate 11B disposed to be opposed to each other via a separator (not illustrated), the area of the notch 14 formed in the positive electrode plate 11A is preferably greater than the area of the notch formed in the negative electrode plate 11B. Furthermore, all of an edge 15b of the notch 14 formed in the negative electrode plate 11B preferably projects outwardly of an edge 15a of the notch 14 formed in the positive electrode plate 11A. When the embodiment is applied to a lithium-ion secondary battery by such a configuration, lithium can be prevented from being precipitated on the negative electrode plate 11B in a charge-discharge cycle.

Although the present disclosure has been described above by way of a preferred embodiment, such a description provides no limitations, and of course, various changes may be made.

For instance, in the embodiment, cutting of the electrode plate 10 is performed by a tube-type combination of a punch and a die as the cutting blades. However, without being limited to this, the electrode plate 10 may be cut by moving one mold to the other mold in a set of molds in a thickness direction of the electrode plate 10. Both molds of a pair of molds may be moved for cutting. Also, a mold which moves for cutting between the pair of molds does not necessarily need to be moved perpendicular to the width direction A. For instance, the mold may be moved diagonally with respect to the width direction A, or moved by following an arc-shaped locus. In a pair of molds, end sides of each other may have a point of intersection, and cutting may be performed while the end sides of each other are brought into contact at the point of intersection. For the mold on the die plate side between the pair of molds, cutting may be performed by applying a thin blade to the electrode plate as on the punch plate side.

The battery applied to the embodiment is not particularly limited, and for instance, a battery such as a lithium-ion secondary battery and a nickel hydride battery may be applied.

REFERENCE SIGNS LIST

10 Electrode Plate
11 Electrode Plate for Batteries (Single Plate)
11A Positive Electrode Plate
11B Negative Electrode Plate
13 Tab
14 Notch
15a, 15b Edge of Notch
20 Through Hole
21 Cutting Line
30A, 30B Cutting Blade
31 Punch Plate
32 Hole Punch
40, 42 Cutting Blade
41 Die Plate

The invention claimed is:

1. A battery including an electrode body in which a positive electrode plate and a negative electrode plate are disposed to be opposed to each other via a separator,
wherein in each of the positive electrode plate and the negative electrode plate,
a pair of notches are formed in first and second end sides opposed to each other, and
in a third end side different from the first and second end sides, a tab extending from the third end side is formed,
wherein each of the pair of notches has a pair of opposed lateral sides and an innermost end side between the pair of opposed lateral sides, wherein the innermost end side is located inward from a corresponding one of the first and second end sides of the at least one electrode plate, and
the tab has an entire perimeter thereof at a position away and inward from the innermost end side of each of the pair of notches in a direction perpendicular to the first and second end sides of the each of the positive electrode plate and the negative electrode plate,
wherein an area of the notches formed in the positive electrode plate is greater than an area of the notches formed in the negative electrode plate,
wherein an entirety of the pair of opposed lateral sides of the notches formed in the positive electrode plate is free of overlap with the notches formed in the negative electrode plate.

2. The battery according to claim 1, wherein a length of each of the first and second end sides is greater than or equal to 100 mm.

3. The battery according to claim 1, wherein at least one electrode plate of the positive electrode plate and the negative electrode plate further has a conductive core, an active material layer formed on a surface of the conductive core, and a separator on the active material layer, and
the notch is formed at an overlapping position in the conductive core, the active material layer, and the separator.

4. The battery according to claim 1, wherein a length of the notch in a direction along the corresponding one of the first and second end sides is shorter than a length of the corresponding one of the first and second end sides, excluding the notch.

5. The battery according to claim 1, wherein in a laminated body of the positive electrode plate and the negative electrode plate disposed to be opposed to each other via the separator, all of an edge of the notches formed in the negative electrode plate projects outwardly of an edge of the notches formed in the positive electrode plate.

6. The battery according to claim 1, wherein each of the pair of notches is formed at a center of a corresponding one of the first and second end sides.

* * * * *